United States Patent

McDermott et al.

[11] Patent Number: 5,536,050
[45] Date of Patent: Jul. 16, 1996

[54] CONNECTION FOR FABRICATING MANDREL BAR FROM USED SEGMENTS

[75] Inventors: John F. McDermott, Monroeville; Yoni Adonyi, Pittsburgh; Jerry Hann, N. Huntingdom, all of Pa.; Paul M. Albritton, Adamsville; Miles G. Sanderson, Birmingham, both of Ala.

[73] Assignee: USX Corporation, Pittsburgh, Pa.

[21] Appl. No.: 376,227

[22] Filed: Jan. 23, 1995

[51] Int. Cl.⁶ .................................................. F16L 13/02
[52] U.S. Cl. .......................... 285/286; 285/289; 285/397; 285/370; 228/50; 228/140
[58] Field of Search ............................. 228/50, 140, 139, 228/135, 126, 128; 285/284, 286, 370, 333, 390, 389, 371, 172, 289

[56] References Cited

U.S. PATENT DOCUMENTS

| | | | |
|---|---|---|---|
| 918,926 | 4/1909 | Tanner | 285/286 |
| 1,907,522 | 5/1933 | Eaton | 285/397 |
| 2,646,995 | 7/1953 | Thompson | 285/286 |
| 2,699,182 | 1/1955 | Baldridge, Jr. | 285/397 |
| 2,963,129 | 12/1960 | Eberle . | |
| 3,432,915 | 3/1969 | Doyle | 228/50 |
| 3,508,766 | 4/1970 | Kessler et al. | 285/370 |
| 3,619,548 | 11/1971 | Cavagnero . | |
| 4,142,085 | 2/1979 | Knipstrom et al. . | |
| 4,201,326 | 5/1980 | Connell | 228/50 |
| 4,213,555 | 7/1980 | Minkiewicz et al. | 228/50 |
| 4,530,527 | 7/1985 | Nolmberg | 285/397 |

FOREIGN PATENT DOCUMENTS

| | | | |
|---|---|---|---|
| 848476 | 9/1940 | United Kingdom | 285/286 |

OTHER PUBLICATIONS

The Welding Encyclopedia, 11th Edition, Oct. 15, 1943, pp. 456–457.

*Primary Examiner*—Eric K. Nicholson
*Attorney, Agent, or Firm*—Armstrong, Westerman, Hattori, McLeland & Naughton

[57] ABSTRACT

In the fabricating of a mandrel bar, a plurality of used mandrel bar segments are provided, each of which has a central bore comprising a smooth surface portion and a threaded portion. Each segment has a circumferential recess at an end thereof and a bevelled surface adjoining the recess and extending inwardly of the segment at an angle to the vertical. A coupling has a smooth central boss section and threaded ends. A connection is made by threadedly connecting the ends of the coupling with a pair of opposed mandrel segments, with the smooth boss of the coupling fitting inside the smooth portion of the bore of each segment to effect, with the threaded joint, a straight, tight joint. A weld groove of gull-shaped cross-section is provided between the opposed ends of a pair of mandrel segments, having a body portion formed by a pair of opposed bevelled surfaces and wings formed by a pair of opposed recesses.

7 Claims, 2 Drawing Sheets

CONNECTION FOR FABRICATING MANDREL BAR FROM USED SEGMENTS

BACKGROUND OF THE INVENTION

1. Field of the Invention

This invention provides means and methods for fabricating mandrel bars from recycled used segments of mandrel bars used in the manufacture of seamless pipe.

2. Description of Prior Art

In the manufacture of seamless steel pipe, mandrels are used to support the interior of a hollow article being rolled into the form of a pipe. Such mandrels are subjected to extremely harsh mechanical and chemical environmental conditions and, despite their fabrication of wear- and corrosion-resistant steels, such as H-13 chromium steels, they need to be replaced frequently, at great expense. Such wearing of the mandrels is uneven; some parts of the mandrel may be so worn as to be useless for further service, while other segments may be in comparatively good condition. Nevertheless, under such circumstances, it has been the practice to discard the entire mandrel and install a new one.

It is an object of the present invention to recover reusable segments of such mandrels and to join such segments together, by a special welded and threaded joint, to form a useful new mandrel.

SUMMARY OF THE INVENTION

Reusable segments are cut from worn mandrels. Each segment has a central bore along the longitudinal axis of the segment. An exterior end portion about the periphery of the segment is cut away, forming a shallow ring-like recess and the end of the segment adjacent the recess is cut at an angle to the centerline of the segment. A portion of the bore spaced from the end of the mandrel segment is internally threaded, and juxtaposed segments are joined together by means of a coupling having a middle portion in the form of a smooth-surfaced boss and the ends of which are externally threaded and which, in an assembled condition, engage the internal threads of opposed mandrel segments to some fraction (typically ⅓ to ⅔) of a 360-degree turn beyond snug fit. A girth weld then is made about the periphery of the opposed ends of the mandrel segments, the weld cross-section being of "seagull" form, with the body of V-shape formed by weld metal deposited in the angular cutaway portions of the mandrel segment ends and the "wings" of the weld formed by deposition of weld metal in the opposed cutaway recess portions of the juxtaposed ends of the mandrel segments.

DESCRIPTION OF PREFERRED EMBODIMENTS

Figure 1:
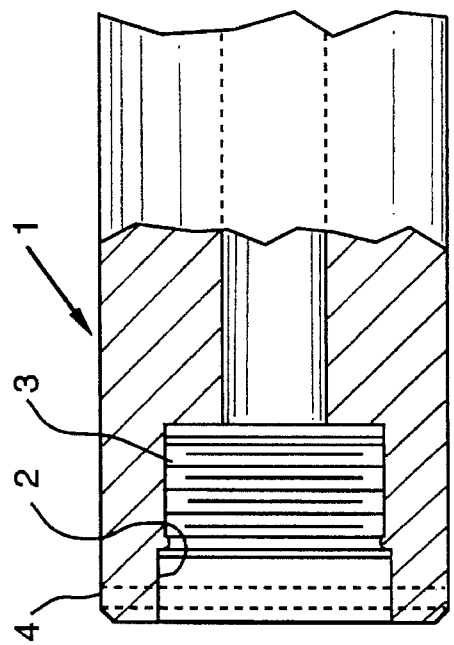
FIG. 1 is a side view, partly in cross-section, of a mandrel segment.
Figure 5:
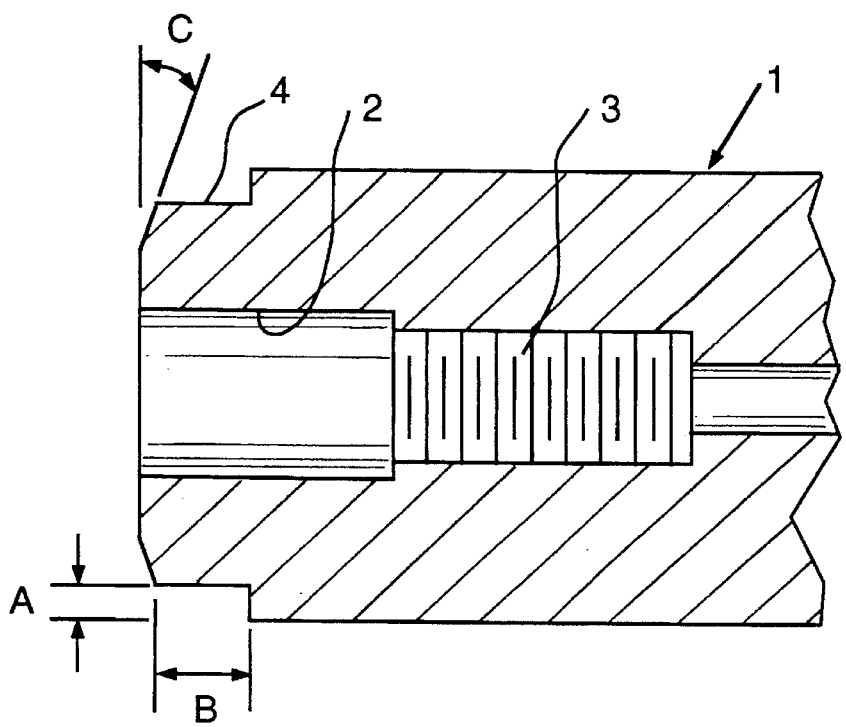
FIG. 5 is an enlarged side cross-sectional view of a mandrel segment.

FIGS. 1 and 5 depict a mandrel segment generally denoted by the numeral 1. Internally, the mandrel segment 1 has a smooth bore or internal boss portion 2 and a threaded portion 3. An end portion of the external periphery of the mandrel segment 1 is cut away to form a shallow recess 4 having a depth A, e.g. about 0.125 inch and a length B, e.g. about 0.5 inch. The end of the mandrel segment adjacent the recess 4 is formed in a bevel at an angle C, e.g. about 30 degrees, from the vertical.

Figure 2:
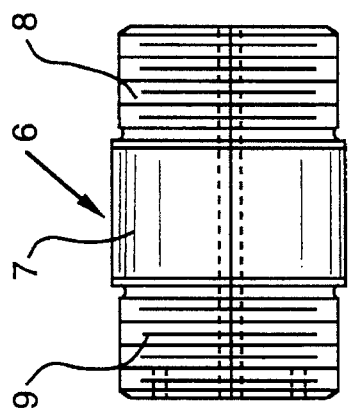
FIG. 2 is a side view of the coupling used to connect opposed mandrel segments.
Figure 3:
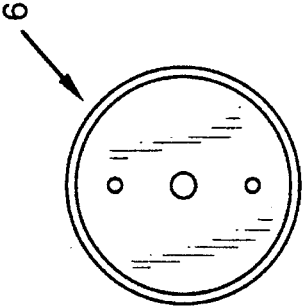
FIG. 3 is an end view of the coupling shown in FIG. 2.
Figure 4:
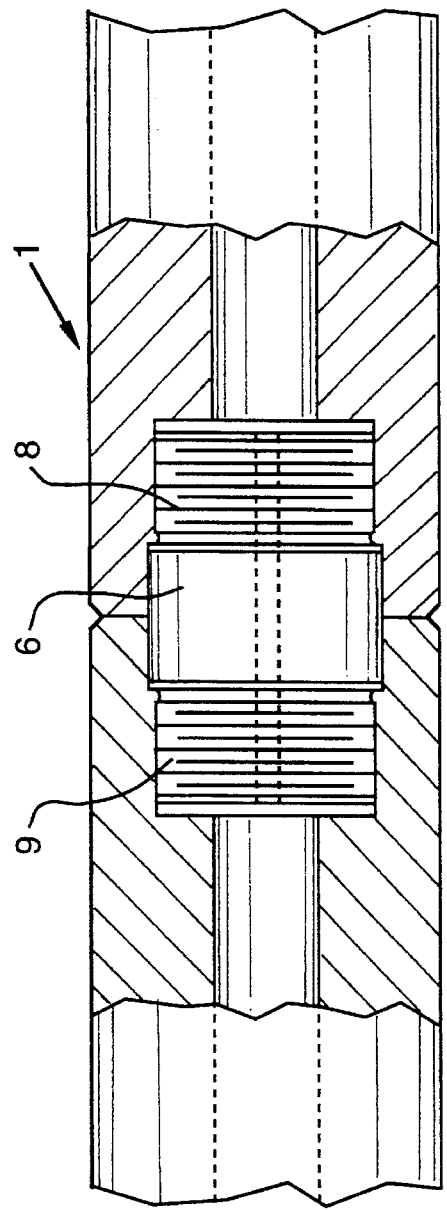
FIG. 4 is a side view, partly in cross-section, of the assembled joint comprising two opposed mandrel segments and the coupling, with a girth weld, according to the invention.

FIGS. 2 and 3 depict a coupling denoted generally by the numeral 6, having a central smooth external boss portion 7, e.g. of a length of about 4 inches, and threaded end portions 8 and 9.

A joint is assembled by inserting the coupling 6 inside the bore of two opposed mandrel segment, and screwing the threaded portions of the mandrel segments and the coupling together. The continuous tight fit of the external boss 7 of the coupling 6 against the internal boss 2 of the mandrel segment ensures straightness of the assembled connection. Absent such structure, a very slight out-of-squareness of the cut ends of the mandrel segments, coupled with the normal radial looseness of the thread fits, could result in out-of-straightness of the connection. Connection straightness is imperative (1) to accommodate straight and constant-inside-diameter hot pipe shells fitting over the mandrel (a kink in the mandrel would be detrimental to inside-surface quality of the finished pipe), and (2) to preclude local bending of the fabricated mandrel bar that could result from eccentricity of the bar longitudinal tension or compression force from the center of gravity of the bar cross-section (local bending tending to be greatest at a kink in the bar), with consequent higher stresses leading to premature fatigue failures.

Figure 6:
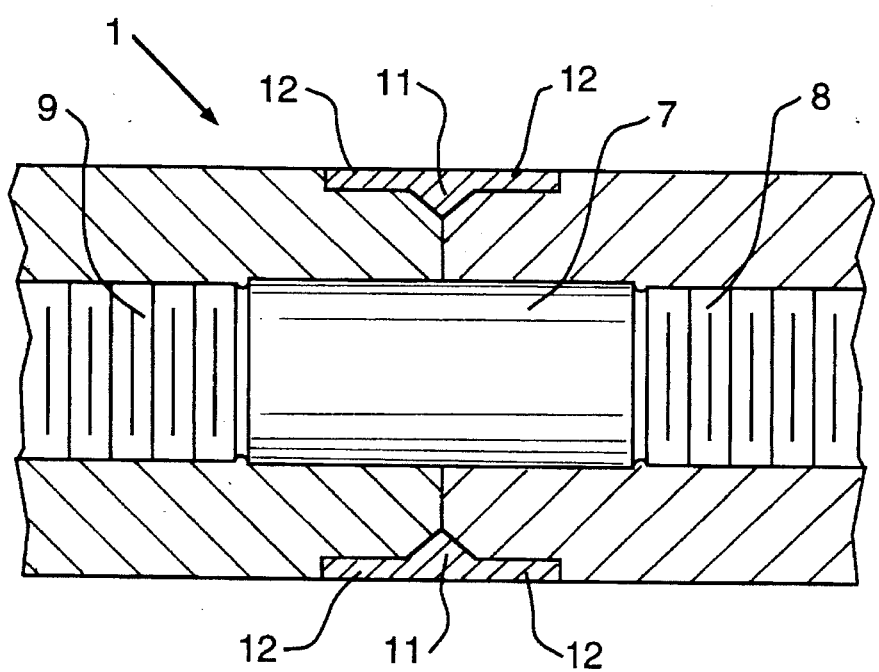
FIG. 6 is an enlarged side cross-sectional view of the assembled joint comprising two opposed mandrel segments and the coupling, with a girth weld, according to the invention.

FIG. 6 shows in more detail the girth weld effected between the opposed ends of the mandrel segments of an assembled joint. That weldment is of "seagull" cross-sectional form having a body 11 of weld metal deposited in the V-shaped groove formed by the cutaway ends of the mandrel segments, and "wings" 12 formed by weld metal deposited in the recesses 4 formed in the end portions of the mandrel segments. The geometry of the recesses 4, machined in the outer portions of the mandrel bar cut ends to receive the circumferential sealing weld, are specially tailored to minimize the amount of weld deposit and heating (to minimize residual tensile stresses from the welding) but to cause the weld to remain tight during service loading, without being required to contribute significantly to the strength of the connection. In any connection, stress is related to stiffness, and it is therefore rarely possible to have two different mechanisms with different stiffness characteristics (e.g. threads and welds) sharing the loading ideally in proportions to their total strengths. With the seagull cross-section, the center body of the girth weld effects the seal while providing minimal connection stiffness that would attract much longitudinal-thrust resistance. However, the wings of the recess 4 provide superior bond surface (very high ratio of bond surface to weld volume) to cause the weld to remain tight, as well as to provide a longer weld width for metallurgical considerations as discussed below. Also, the weld width (tip-to-tip of the wings) provides a significant longitudinal distance over which any tendency for service-loading strain concentration in the weld can be accommodated, thereby minimizing stress concentrations in the weld. In contrast with the above described girth weld, experience with welded splices of mandrel segments have demonstrated that conventional V-butt welded joints have failed from not remaining tight and from being too highly stressed.

The circumferential or girth sealing weld of this invention is a partial-penetration type groove weld with a 60-degree included angle (the "seagull body"), supplemented on each side by weld metal filling typically a 0.5 inch wide by 0.125 inch deep recess 4 which is machined adjacent to the weld groove (the "seagull wings"). This significant addition to the weld width at the mandrel surface is necessary in order to remove the carburized outer layer of the used mandrel segment and to allow for welding on uncontaminated base metal.

As previously noted, the mandrel segments 1 are composed of a hard tool steel, such as H-13 steel. Special consideration must be given to this fact in the placement of the circumferential girth sealing weld. Dimensional stability must be maintained during and after welding to avoid adverse metallurgical conditions and residual strains and stresses that would result in premature fatigue failure of the weld. Such considerations necessitate strict control over the heating and cooling rates and over the weld pass sequencing. In the weld vicinity, the parts being joined should be properly supported and preheated to about 900–1000 degrees F at a rate of about 100° F. increase per hour. They should be maintained at about 600° F. maximum interpass temperature during welding, and then be cooled at a rate of about 50° F. per hour. The main consideration in the weld pass sequencing relates to achieving circumferential/radial balance in weld placement, similar to balancing bolt tightening when an automobile tire is changed. The first half (at the root) of the V-groove should be filled by welding in quadrants, such as counterclockwise from 3-to-12, clockwise from 6-to-9, counterclockwise from 6-to-3, and finally clockwise from 9-to-12. The remainder of the welding can be placed in two 180 degree sweeps, counterclockwise from 6-to-12 and then clockwise from 6-to-12 (vertical-up welding).

The individual segments may be of the same or different lengths, and any required number of mandrel bar segments may be used to form a new mandrel bar of desired length.

Application of the invention as above described results in significant savings over the prior practice of discarding an entire pipe mill mandrel when at least a portion of the mandrel is worn so as to be unusable.

What is claimed is:

1. A connection for joining a plurality of used mandrel bar segments comprising a coupling having a central smooth boss section and threaded ends, each segment having a central bore in which a portion adjacent an end of the segment has a smooth boss surface adapted to slidingly receive one half the length of the central boss section of the coupling and in which a portion of the bore extending lengthwise of the segment from the mandrel bar boss portion is threaded for reception of a corresponding threaded end of the coupling, each segment also having a circumferential recess extending about an end thereof and a bevelled end portion adjacent the recess and extending inwardly of the segment at an angle to a line extending vertically with respect to a centerline of the segment.

2. A connection according to claim 1, wherein the recess has a depth of about 0.125 inch and a width of about 0.5 inch, and the angle of the bevelled end portion is about 30°.

3. A connection for a plurality of segments in a mandrel bar, comprising a plurality of used mandrel bar segments, each of which has a central bore comprising a smooth section adjacent an end of the segment and a threaded section extending from the smooth section along a portion of the length of the segment, each segment having a circumferential recess at the end of the segment and a bevelled surface adjoining the recess and extending inwardly of the segment at an angle to the vertical, and a coupling having a central smooth boss section adapted for a sliding fit into the smooth section of the bore of a segment and threaded ends for engagement with the threads of the bore of a segment, wherein, in an assembled condition of a coupling and a pair of segments, a circumferential weld groove of gull-shaped cross-section is provided having a V-shaped body portion formed by opposed bevelled surfaces and wings formed by opposed recesses.

4. A connection according claim 3, wherein the weld groove is filled with weld metal.

5. A connection according to one of claims 3 and 4, wherein the angle of the bevelled surface is about 30°, and each recess has a depth of about 0.125 inch and a width of about 0.5 inch.

6. In a reconstructed seamless pipe mill mandrel bar comprising a plurality of mandrel bar segments cut from one or more used mandrel bars, a connection for joining said plurality of mandrel bar segments, said connection comprising a coupling having a central boss portion in the form of a smooth-surfaced cylinder and having threaded end portions, each of said mandrel bar segments having a bore centrally extending into the mandrel bar segment along a longitudinal centerline thereof and comprising a smooth surfaced end boss portion adapted for a sliding fit with a corresponding boss on the coupling and a threaded portion adjacent an end of the mandrel boss portion extending longitudinally thereof along a centerline of the mandrel bar segment and adapted to engage a corresponding threaded portion of the coupling, an end of each mandrel segment being provided with a circumferentially extending recess adjacent a circumferentially extending bevelled surface on the end of the mandrel segment, whereby, when opposed ends of two mandrel segments are threadedly connected by the coupling, there is provided a weld groove having a body portion formed by the bevelled end surfaces and a pair of wings extending outwardly from the body portion in a direction parallel to a longitudinal centerline of the assembled joint and formed by the adjoining recesses in the ends of the opposed mandrel segments.

7. A connection according to claim 6, wherein the weld groove is filled with weld metal.

* * * * *